United States Patent
Wang et al.

(10) Patent No.: US 12,340,486 B1
(45) Date of Patent: Jun. 24, 2025

(54) METHOD FOR DETERMINING SEAM LINE OF ORTHOIMAGES, METHOD FOR GENERATING MOSAIC IMAGE OF ORTHOIMAGES, DEVICE THEREOF, AND MEDIUM THEREOF

(71) Applicant: SUN YAT-SEN UNIVERSITY, Guangdong (CN)

(72) Inventors: Qingsong Wang, Guangdong (CN); Haisong Weng, Guangdong (CN); Ke Shi, Guangdong (CN); Tao Lai, Guangdong (CN); Haifeng Huang, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 0 days.

(21) Appl. No.: 18/943,847

(22) Filed: Nov. 11, 2024

Related U.S. Application Data

(63) Continuation of application No. PCT/CN2024/104125, filed on Jul. 8, 2024.

(30) Foreign Application Priority Data

May 23, 2024 (CN) .......................... 202410642378.5

(51) Int. Cl.
*G06T 5/50* (2006.01)
*G06T 7/13* (2017.01)
*G06T 7/64* (2017.01)

(52) U.S. Cl.
CPC .................. *G06T 5/50* (2013.01); *G06T 7/13* (2017.01); *G06T 7/64* (2017.01); *G06T 2207/20221* (2013.01)

(58) Field of Classification Search
CPC .... G06T 5/50; G06T 7/13; G06T 7/64; G06T 2207/20221
See application file for complete search history.

(56) References Cited

FOREIGN PATENT DOCUMENTS

CN     106127683 B  *  5/2019  .......... G06T 3/4038

OTHER PUBLICATIONS

Xuchao Chai et al., "An Upscaling-Downscaling Optimal Seamline Detection Algorithm for Very Large Remote Sensing Image Mosaicking", pub. Dec. 24, 2022 (Year: 2022).*

(Continued)

*Primary Examiner* — Mekonen T Bekele

(57) ABSTRACT

A method for determining a seam line of orthoimages, method for generating a mosaic image, device, and medium. The method includes: extracting valid area contours of a master image and a slave image respectively through a crawling search method; calculating difference values of valid pixels within an overlapping area between the master and slave images through a difference function, to obtain a difference map of the valid area; if there are more than two intersection points: calculating a position of a centroid of the overlapping area based on coordinates of each contour point of the intersection contour, determining a rectangular window centered on the centroid in the difference map, searching the rectangular window, and taking a position with a smallest difference value as an optimization end and the intersection points as optimization starts; determining, based on the optimization start and optimization end, a seam line through an A* algorithm.

19 Claims, 8 Drawing Sheets

(56) References Cited

OTHER PUBLICATIONS

Zheng Maoteng "A novel orthoimage mosaic method using a weighted A*algorithm—Implementation and evaluation", pub. 2018 (Year: 2018).*

Zahra Hossein Nejad et al., "Clustered redundant keypoint elimination method for image mosaicing using a new Gaussian-weighted blending algorithm", pub. 2021 (Year: 2021).*

Xuchao Chai et al., An Upscaling-Downscaling Optimal Seamline Detection Algorithm for Very Large Remote Sensing Image Mosaicking, pub. Dec. 24, 2022 (Year: 2020) (Year: 2022).*

Zheng Maoteng A novel orthoimage mosaic method using a weighted A*algorithm—Implementation and evaluation, pub. 2018 (Year: 2018) (Year: 2018).*

D. Ghosh et al., (hereafter Ghosh), "A survey on image mosaicing techniques", pub. Oct. 30, 2015 (Year: 2015).*

* cited by examiner

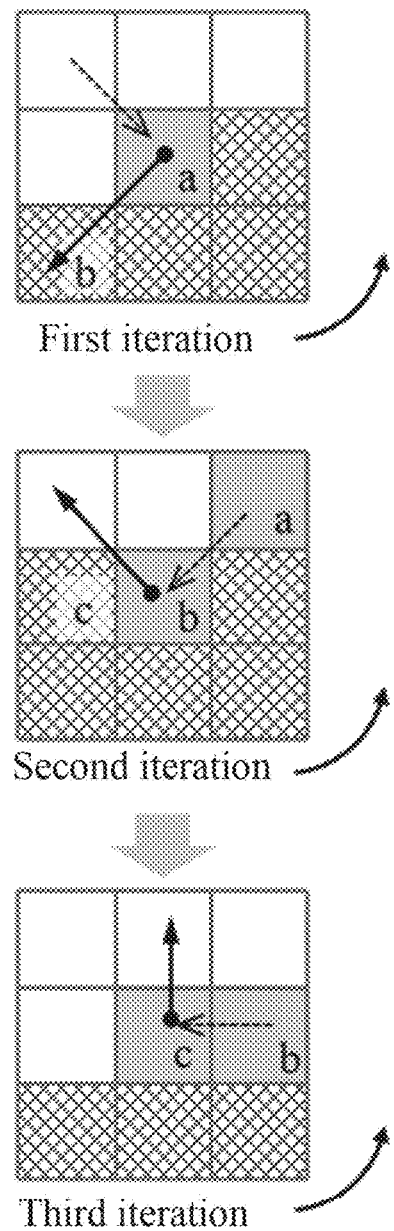
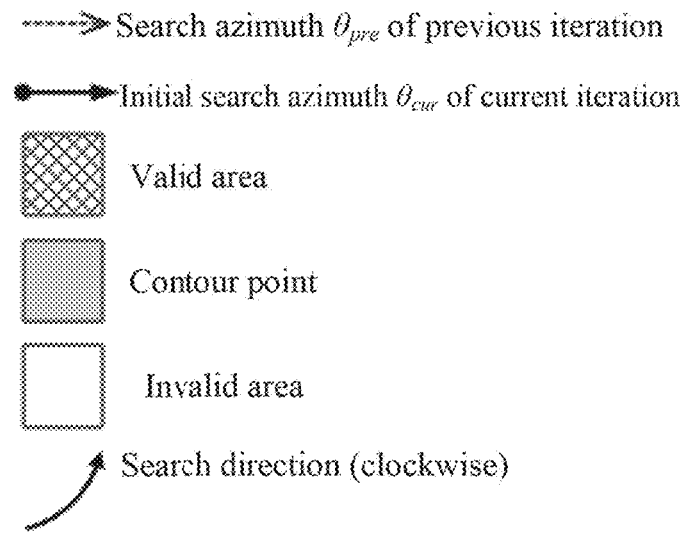
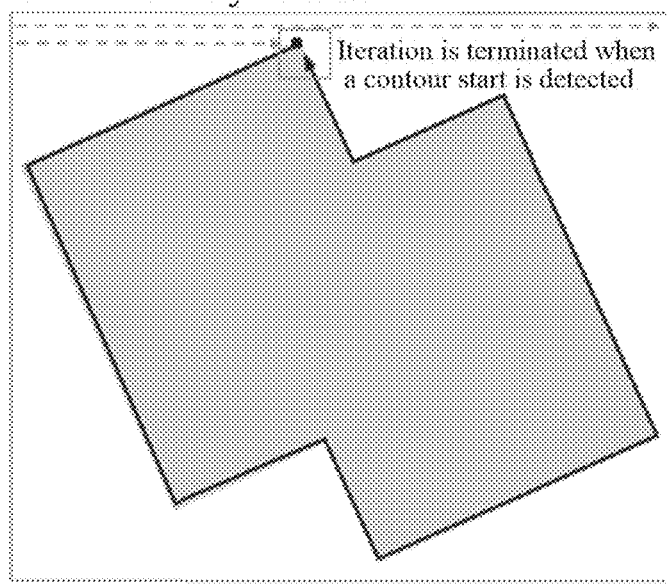
FIG. 3(a)
FIG. 3(b)

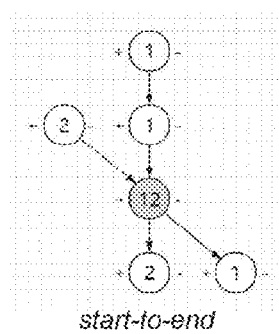 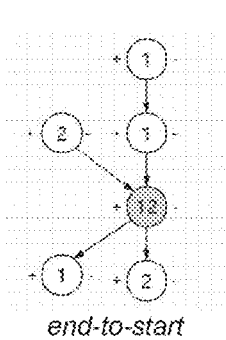 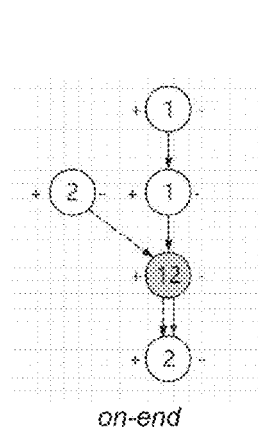 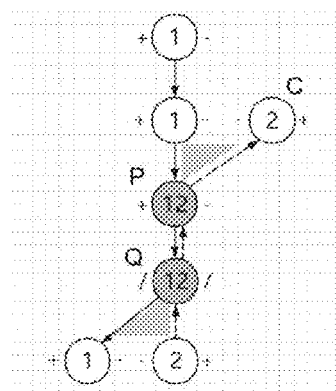
FIG. 9(a)  FIG. 9(b)  FIG. 9(c)  FIG. 9(d)
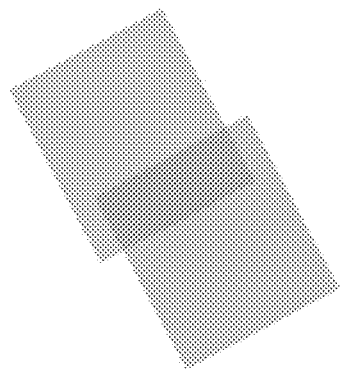 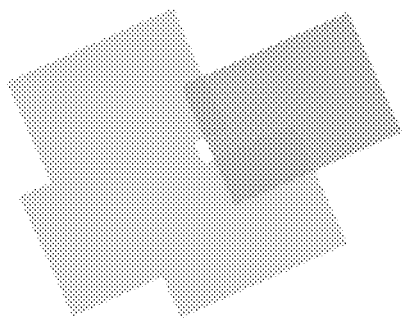
FIG. 10(a)  FIG. 10(b)
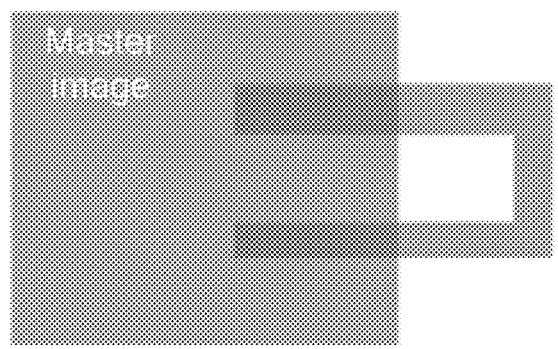 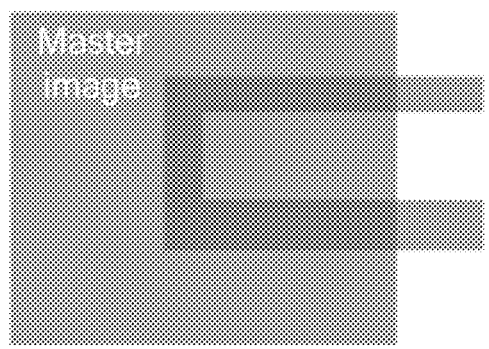
FIG. 11(a)  FIG. 11(b)

METHOD FOR DETERMINING SEAM LINE OF ORTHOIMAGES, METHOD FOR GENERATING MOSAIC IMAGE OF ORTHOIMAGES, DEVICE THEREOF, AND MEDIUM THEREOF

CROSS REFERENCE TO RELATED APPLICATIONS

The present application is a Continuation Application of PCT Application No. PCT/CN2024/104125 filed on Jul. 8, 2024, which claims the benefit of Chinese Patent Application No. 202410642378.5 filed on May 23, 2024. All the above are hereby incorporated by reference in their entirety.

TECHNICAL FIELD

The present disclosure relates to the field of remote sensing image data processing, and in particular to a method for determining a seam line of orthoimages, a method for generating a mosaic image of orthoimages, a device thereof, and a medium thereof.

BACKGROUND

With the rapid development of aerospace remote sensing technology and the widespread application of geographic information system (GIS), the use of optical or synthetic aperture radar (SAR)-based remote sensing satellites for Earth observation has become a main way to acquire geographic information. Orthoimages have the advantages of high accuracy, simple recognition, and rich readable geographic information, and play a very important role in cartography, environmental detection, land use planning, and disaster monitoring, etc. The basic steps for generating an orthoimage include image preprocessing, image matching, image localization, image mosaicking, and image output. As one of the key steps of orthoimage production, image mosaicking aims to process and mosaic multiple remote sensing images with an overlapping area into one orthoimage. From the current stage of development, seamless mosaicking for automatic orthoimage production is a challenge in the development of photogrammetry and remote sensing. Due to the different imaging parameters of different sensors, the complex relationship between surface features in the target scene, and the possible changes in the surface features due to different shooting times, different remote sensing images may be inconsistent in the overlapping area. Therefore, it is necessary to avoid areas with significant differences through a seam line, so as to avoid obvious geometric misalignment and color differences in the final mosaic image. The automatic generation of the seam line is a key issue in the automatic orthoimage production.

At present, a common research approach in remote sensing image mosaicking is to first generate global initial seam line grids, and then perform local optimization of the seam line based on grid nodes. The initial seam line grids are the foundation and prerequisite for the local optimization of the seam line, and the complexity of the grids directly affects the local optimization of the seam line. The generation methods of initial seam line grids are roughly divided into two categories: geometric and pixel-based methods. Currently, geometric method is the mainstream method, which has a basic prerequisite of representing the valid area of the orthoimage and the overlapping area between images through a convex quadrilateral or approximate convex quadrilateral. However, for complex overlapping cases such as arbitrary convex or concave polygons, the geometric method cannot guarantee that the generated seam line is always within the overlapping area between adjacent orthoimages. This increases the difficulty of the subsequent local optimization algorithm for the seam line, and may even lead to the failure of the optimization algorithm. Besides, in the geometric method, the contour of the valid area of the remote sensing image is represented by a finite number of nodes. A relatively regular quadrilateral contour can be described only by the four corners of the valid area. However, in the processing of orthoimages generated by SAR, the contours of the remote sensing images are usually irregular. In this case, if the contour is approximated by a small number of nodes, it is easy to cause some invalid pixels to be misclassified into the valid area or some valid pixels to be misclassified into the invalid area, thereby resulting in voids in the mosaicked result or partial information loss in the image.

Therefore, it is urgent to solve the problem of accurately determining the seam line of multiple orthorectified remote sensing images with irregular contours.

SUMMARY

The present disclosure provides a method for determining a seam line of orthoimages, which can more accurately determine a seam line of multiple orthorectified remote sensing images with irregular contours.

To achieve the above objective, the present disclosure adopts the following technical solutions:

A first aspect of the present disclosure provides a method for determining a seam line of orthoimages, including the following steps:
  preprocessing orthoimages to obtain a master image and a slave image, where there is an overlapping area between the slave image and the master image;
  extracting valid area contours of the master image and the slave image respectively through a crawling search method;
  determining intersection points of the respective valid area contours of the master image and the slave image;
  acquiring an intersection contour of the master image and the slave image;
  calculating difference values of valid pixels within the overlapping area between the master image and the slave image through a difference function, to obtain a difference map of the valid area; if there are more than two intersection points: calculating a position of a centroid of the overlapping area based on coordinates of each contour point of the intersection contour, determining a rectangular window centered on the centroid in the difference map, searching the rectangular window, and taking a position with a smallest difference value as an optimization end and the intersection points as optimization starts; and if there are two intersection points: taking the two intersection points as an optimization start and an optimization end, respectively; and
  determining, based on the optimization start and the optimization end, a seam line of the master image and the slave image through an A* algorithm.

Further, in a preferred example of the present disclosure, the preprocessing orthoimages includes:
  acquiring longitude and latitude coordinates corresponding to index values of each pixel in the orthoimages to obtain reference longitude and latitude of the orthoimages; and
  sorting the orthoimages based on the reference longitude and latitude.

Further, in a preferred example of the present disclosure, the preprocessing orthoimages includes:
  representing pixels of different orthoimages in a same index coordinate system through interpolation processing; and
  setting longitude and latitude resolutions of the different orthoimages to be the same.

Further, in a preferred example of the present disclosure, the determining intersection points of the respective valid area contours of the master image and the slave image includes:
  acquiring contour points with same index coordinates in the respective valid area contours of the master image and the slave image, to obtain the intersection points.

Further, in a preferred example of the present disclosure, the method includes:
  building a contour point lookup table based on a hash table and a list, and storing the contour points of the valid area contours in the contour point lookup table; and
  determining, through the contour point lookup table during an execution process of the crawling search method, whether a searched contour point is already located on a contour line from which the searched contour point is originated; and if yes, clipping the contour line.

Further, in a preferred example of the present disclosure, the method includes:
  In responsive to the valid pixel being detected through the crawling search method and a search azimuth being not a multiple of 90 degrees (0 degrees, 90 degrees, 180 degrees, 270 degrees), determining a valid pixel as a diagonal virtual contour point, and taking the valid pixel as a contour point of the valid area contour; and
    comparing the contour points of the master image and the slave image in the contour point lookup table to obtain the intersection points.

Further, in a preferred example of the present disclosure, the acquiring an intersection contour of the master image and the slave image includes:
  determining a position relationship between the contour point of the valid area contour and a grid point;
  determining a start that is located within the overlapping area between the master image and the slave image and is originated from only one contour line; and
  traversing and comparing, based on the position relationship, the contour points of the master image and the slave image one by one from the start, thereby acquiring the intersection contour.

Further, in a preferred example of the present disclosure, the method includes:
  determining, if there are a plurality of overlapping areas between the master image and the slave image, the start of each overlapping area through a contour start determination algorithm.

Further, in a preferred example of the present disclosure, before the acquiring the intersection contour of the master image and the slave image, the method includes:
  merging, if there are redundant intersection points due to the respective valid area contours of the master image and the slave image that overlap or are similar in some areas, the redundant intersection points through a contour intersection point merging algorithm.

A second aspect of the present disclosure provides a method for generating a mosaic image of orthoimages, including:
  preprocessing orthoimages to obtain a master image and a slave image, where there is an overlapping area between the slave image and the master image;
  extracting valid area contours of the master image and the slave image respectively through a crawling search method;
  determining intersection points of the respective valid area contours of the master image and the slave image;
  acquiring an intersection contour of the master image and the slave image;
  calculating difference values of valid pixels within the overlapping area between the master image and the slave image through a difference function, to obtain a difference map of the valid area; if there are more than two intersection points: calculating a position of a centroid of the overlapping area based on coordinates of each contour point of the intersection contour, determining a rectangular window centered on the centroid in the difference map, searching the rectangular window, and taking a position with a smallest difference value as an optimization end and the intersection points as optimization starts; and if there are two intersection points: taking the two intersection points as an optimization start and an optimization end, respectively; and
  determining, based on the optimization start and the optimization end, a seam line of the master image and the slave image through an A* algorithm; and feathering pixels close to the seam line, and then calculating weights of the master image and the slave image in the overlapping area; and
  performing, based on the weights, weighted fusion on the master image and the slave image to obtain a mosaic image.

Further, in a preferred example of the present disclosure, before the feathering the pixels close to the seam line, the method includes:
  acquiring origin information of the intersection points in the intersection contour; and
  determining, based on the origin information and after generating the seam line, an origin of an area divided according to the seam line in the overlapping area between the master image and the slave image.

A third aspect of the present disclosure provide a computer device, including a memory, a processor, and a computer program stored in the memory and executable by the processor, where the processor is configured to execute the computer program so as to implement steps of the method for determining a seam line of orthoimages according to any one of the above paragraphs.

A fourth aspect of the present disclosure provide a computer device, including a memory, a processor, and a computer program stored in the memory and executable by the processor, where the processor is configured to execute the computer program so as to implement steps of the method for generating a mosaic image of orthoimages according to any one of the above paragraphs.

A fifth aspect of the present disclosure provides a computer-readable storage medium, where the computer-readable storage medium is configured to store a program; and the program is executed by a processor to implement the method for determining a seam line of orthoimages according to any one of the above paragraphs.

A sixth aspect of the present disclosure provides a computer-readable storage medium, where the computer-readable storage medium is configured to store a program; and the program is executed by a processor to implement the method for generating a mosaic image of orthoimages according to any one of the above paragraphs.

In conclusion, compared with the prior art, the technical solutions provided by the embodiments of the present disclosure have at least following beneficial effects:

The present disclosure provides a method for determining a seam line of orthoimages. The present disclosure uses a pixel-based contour generation method to process the orthoimages, ensuring that the generated seam line is always located within the overlapping area between the adjacent orthoimages. The present disclosure facilitates the execution of the optimization algorithm, accurately preserves the geometric information of the images and their overlapping area, and is suitable for determining remote sensing image seam lines in various complex overlapping cases and for arbitrary concave-convex polygon contours. Compared with the mainstream geometric method, the present disclosure has stronger universality. The present disclosure uses a crawling search method to search for the valid contour, which is more suitable for extracting irregular concave-convex polygon contours, avoiding the problem that some invalid pixels are misclassified into a valid area or valid pixels are misclassified into an invalid area, resulting in a void in the mosaicked result or partial information loss of the image. The present disclosure improves the accuracy of the determination of the seam line and enhances the efficiency of the determination. Considering that the overlapping area may be an arbitrary concave-convex polygon, the present disclosure adopts centroid and local search methods to determine the position of the optimization end, making the generated end of the seam line more accurate. The present disclosure quantitatively represents the differences in the overlapping area between the images as a difference map through a difference function, and transforms the process of determining the optimal seam line into the process of finding the optimal path from the optimization start to the optimization end through the A* algorithm. The present disclosure achieves the division of a complex overlapping area through a seam line, improving the accuracy of seam line determination.

BRIEF DESCRIPTION OF THE DRAWINGS

FIG. 3(a) is a schematic diagram of a local search of the crawling search method of the method for determining a seam line of orthoimages according to an embodiment of the present disclosure;

FIG. 3(b) is a schematic diagram of an overall search of the crawling search method of the method for determining a seam line of orthoimages according to an embodiment of the present disclosure;

FIG. 9(a) is a schematic diagram of a relationship between a next contour point of a comparison contour and a current contour point in a process of acquiring an intersection contour by the method for determining a seam line of orthoimages according to an embodiment of the present disclosure;

FIG. 9(b) is another schematic diagram of a relationship between a next contour point of a comparison contour and a current contour point in a process of acquiring an intersection contour by the method for determining a seam line of orthoimages according to an embodiment of the present disclosure;

FIG. 9(c) is yet another schematic diagram of a relationship between a next contour point of a comparison contour and a current contour point in a process of acquiring an intersection contour by the method for determining a seam line of orthoimages according to an embodiment of the present disclosure;

FIG. 9(d) is yet another schematic diagram of a relationship between a next contour point of a comparison contour and a current contour point in a process of acquiring an intersection contour by the method for determining a seam line of orthoimages according to an embodiment of the present disclosure;

FIG. 10(a) is a schematic diagram of a case when there is only one overlapping area between a master image and a slave image in the method for determining a seam line of orthoimages according to an embodiment of the present disclosure;

FIG. 10(b) is a schematic diagram of a case when there are a plurality of overlapping areas between a master image and a slave image in the method for determining a seam line of orthoimages according to an embodiment of the present disclosure;

FIG. 11(a) is a schematic diagram of a relationship between a number of deviations from the overlapping area between the master image and the slave image and a number of overlapping areas in the method for determining a seam line of orthoimages according to an embodiment of the present disclosure;

FIG. 11(b) is another schematic diagram of a relationship between a number of deviations from the overlapping area between the master image and the slave image and a number of overlapping areas in the method for determining a seam line of orthoimages according to an embodiment of the present disclosure;

DETAILED DESCRIPTION

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
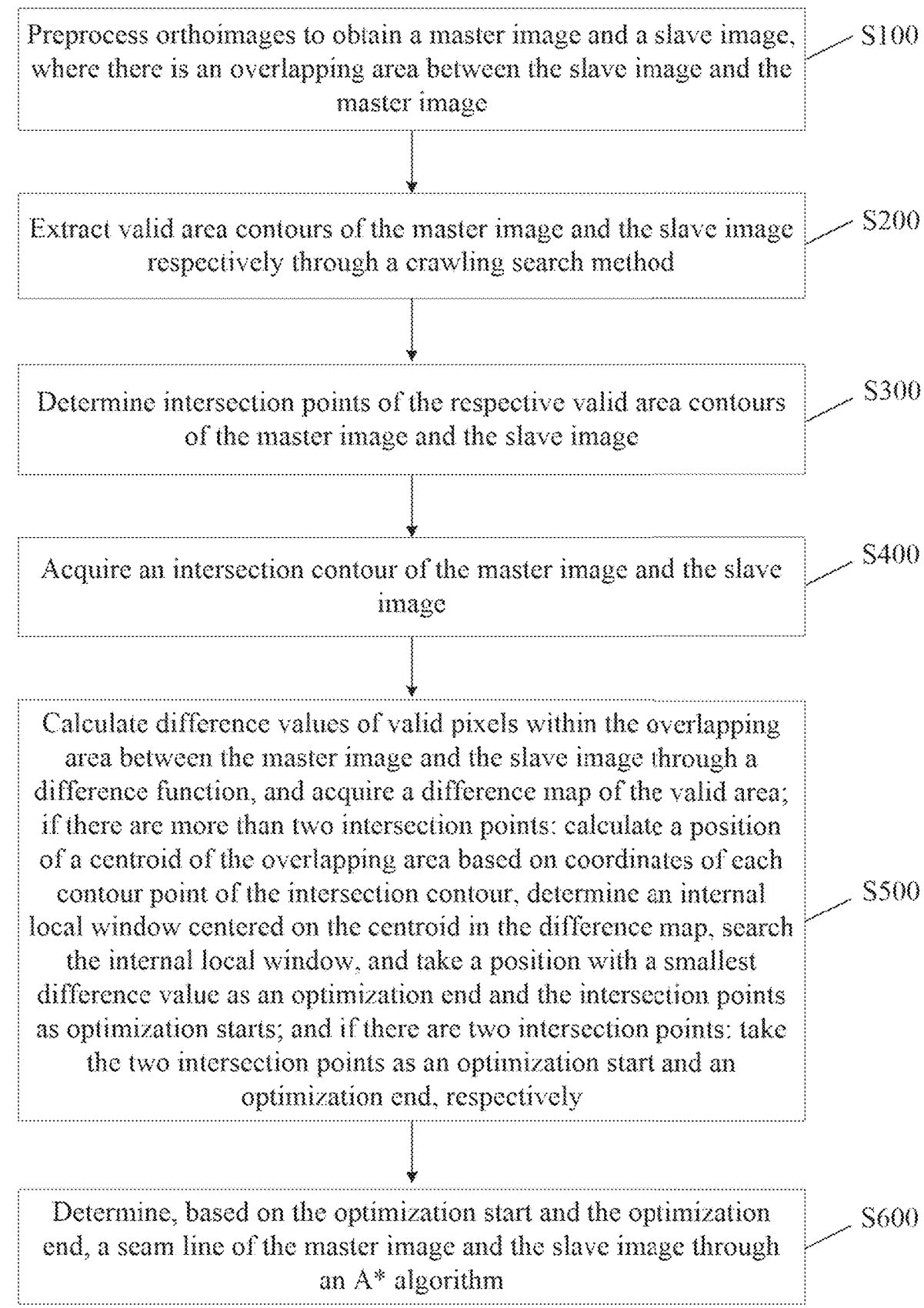
FIG. 1 is a flowchart of a method for determining a seam line of orthoimages according to an embodiment of the present disclosure.

An embodiment of the present disclosure provides a method for determining a seam line of orthoimages. As shown in FIG. 1, the method includes steps S100 to S600 in sequence.

S100. Orthoimages are preprocessed to obtain a master image and a slave image, where there is an overlapping area between the slave image and the master image.

Specifically, the orthoimages are one of the geographic information data acquired by means of Earth observation through an optical or synthetic aperture radar (SAR)-based remote sensing satellite. The master image is a processed image, which can a result of the previous mosaicking. The slave image is an image to be mosaicked onto the master image, which is an unprocessed orthoimage. After the preprocessing, there is an overlap between the master image and the slave image.

S200. Valid area contours of the master image and the slave image are extracted respectively through a crawling search method.

Specifically, the crawling search method includes the following steps. Firstly, for the master images or the slave images, coordinates of a first valid pixel are found by searching line by line and column by column. This pixel is taken as a start of the crawling search and a start of a contour line of the valid area. The valid pixel is a pixel that can accurately reflect the shape, size, and position of a surface feature, and a determination criterion for the valid pixel can be preset according to a specific application requirement and data quality. Then, an iterative process is executed. In each iteration, only 3×3 sub-blocks centered on the start of the crawling search are considered. For the sake of uniform description, a clockwise direction here is defined as a direction in which the right thumb is perpendicular, pointing out of the plane of the paper, while the other four fingers grip from the y-axis towards the x-axis, and the opposite direction is counterclockwise.

Figure 2:
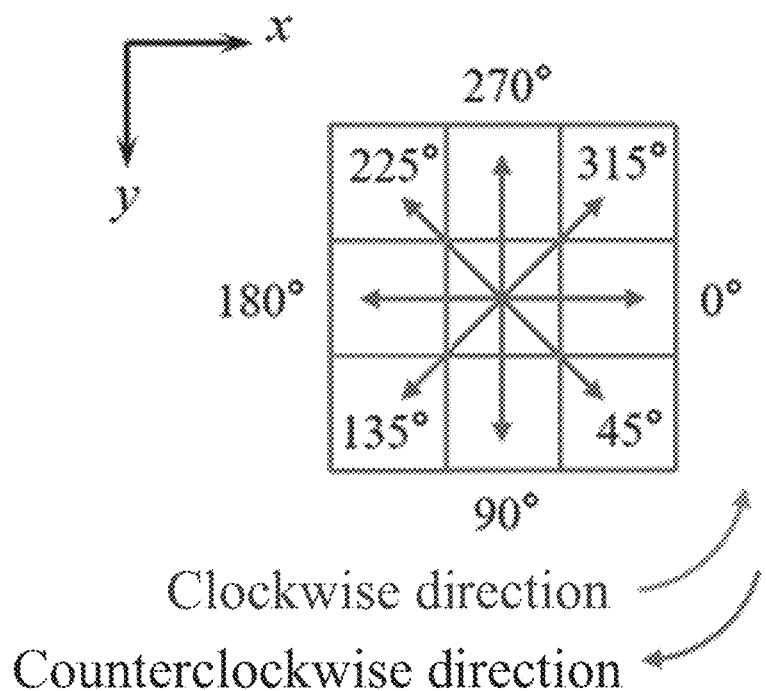
FIG. 2 is a schematic diagram of search azimuth distribution of adjacent grids in a crawling search method of the method for determining a seam line of orthoimages according to an embodiment of the present disclosure.

As shown in FIG. 2, the position relationship between the outer 8 grids of the 3×3 sub-blocks and the search start is described by search azimuth. In terms of azimuth distribution, the positive direction along the x-axis is 0° search azimuth, and the remaining 7 search azimuths increase by 45° in turn in a counterclockwise direction.

FIG. 3(a) and FIG. 3(b) illustrate a crawling search process. FIG. 3(a) is a schematic diagram of a local search. The valid area, contour points, and invalid area in the grids or pixels are shown in the figure. The valid area is an area composed of valid pixels in the orthoimage, and the contour points divide the valid area and invalid area. The search azimuth of the previous iteration is $\theta_{pre}$, and the initial search azimuth of the current iteration is $\theta_{cur}$=mod ($\theta_{pre}$+45°, 360°), resulting from a counterclockwise rotation of 45°. Specifically, in the first iteration, $\theta_{pre}$=45°. Starting from the initial search azimuth, it is sequentially determined whether the adjacent grids of the 8 search azimuths from the search start are valid pixels in a clockwise direction. After each determination, the search azimuth needs to be rotated 45° clockwise, i.e. $\theta_{cur}$=mod ($\theta_{cur}$−45°, 360°). When a valid pixel value is detected for the first time, the current search ends, and the grid coordinates and search azimuth of the detected valid pixel are saved to prepare for the initialization of the search start and search azimuth for the next iteration. When a detected contour point coincides with the contour start, the iteration is terminated, and then a contour line composed of a set of contour points is acquired. At this point, the contour extraction of the valid area of the image is completed. The contour line is taken as the valid area contour. FIG. 3(b) is a schematic diagram of an overall search. As shown in the figure, the search start is determined line by line and column by column, and the iteration is terminated when the contour start is detected.

S300. Intersection points of the respective valid area contours of the master image and the slave image are determined.

Specifically, in the step S200, after the valid area contours of the master image and the slave image are extracted respectively, the contour points at the intersection positions of the two valid area contours in the same coordinate system are determined to obtain the intersection points.

S400. An intersection contour of the master image and the slave image is acquired.

Specifically, the intersection contour refers to contour points located simultaneously within or on the contour line of both the master image and the slave image.

S500. Difference values of valid pixels within the overlapping area between the master image and the slave image are calculated through a difference function, and a difference map of the valid area is acquired. If there are more than two intersection points, a position of a centroid of the overlapping area is calculated based on coordinates of each contour point of the intersection contour, a rectangular window centered on the centroid in the difference map is determined, the rectangular window is searched, and a position with a smallest difference value is taken as an optimization end while the intersection points are taken as optimization starts.

If there are two intersection points, the two intersection points are taken as an optimization start and an optimization end, respectively.

Specifically, first, the difference values of the valid pixels within the overlapping area between the two images are calculated through the difference function to acquire the difference map of the valid area. The overlapping area refers to an overlapping part of the valid areas of the master image and the slave image. The difference function is a quantitative description of the difference between two images, and its specific form can be replaced according to needs, as long as the value of the difference function is positively correlated with the difference between the images. A larger image difference indicates a larger value of the difference function. For example, the difference function is defined as:

$$f(I_1,I_2)=(I_1-I_2)^2+(\nabla_x I_1-\nabla_x I_2)^2+(\nabla_y I_1-\nabla_y I_2)^2;$$

where, $I_1$ and $I_2$ are the pixel values corresponding to the master image and the slave image, respectively; $\nabla x(\cdot)$ is an x-direction gradient for calculating the pixel value; and $\nabla_y(\cdot)$ is a y-direction gradient for calculating the pixel value.

To avoid the generated seam line overlapping with the intersection contour, a larger value is assigned to the pixels located at the intersection contour, which needs to be greater than the maximum value of the difference map.

Then, the optimization end is calculated in different ways based on the number of the intersection points. If there are not more than two intersection points in the intersection contour, one of the intersection points is directly selected as the optimization start and the other intersection point as the optimization end. If there are more than two intersection points in the intersection contour, the position of the optimization end is determined through the centroid and local search methods as follows. Firstly, the position of the centroid of the overlapping area is calculated based on the coordinates of each contour point of the intersection contour. Then, a search is executed within a rectangular window centered on the centroid to find a position with the smallest difference value as the final optimization end. The width of the rectangular window can be set as a fixed constant or adjusted according to a set ratio based on the image size. When there are multiple intersection points in the intersection contour, the optimization end acquired by this calculation method successfully divides the complex overlapping area into several areas. At this point, there are multiple optimization starts and one optimization end.

S600. Based on the optimization start and the optimization end, a seam line of the master image and the slave image is determined through an A* algorithm.

Figure 4A:
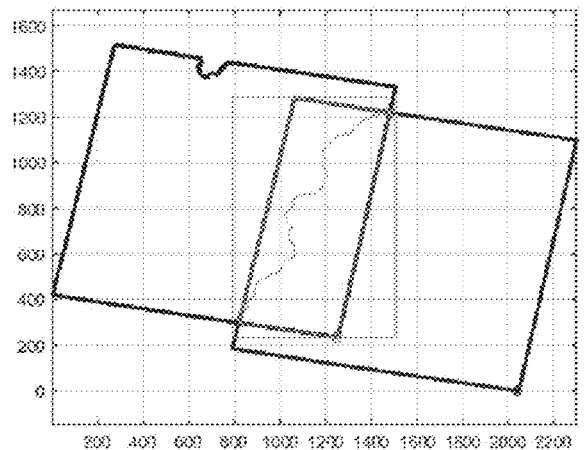
FIG. 4(a) is a schematic diagram of a seam line determined by the method for determining a seam line of orthoimages according to an embodiment of the present disclosure.
Figure 4B:
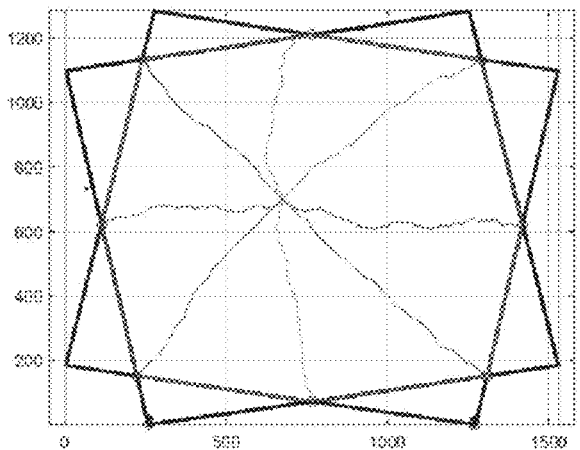
FIG. 4(b) is a schematic diagram of another seam line determined by the method for determining a seam line of orthoimages according to an embodiment of the present disclosure.

Specifically, the intersection point of each intersection contour is taken as the optimization start, and the optimal path from the optimization start to the optimization end on the difference map is found through the A* algorithm, which is called the seam line. The A* algorithm is a heuristic search algorithm widely used in graph search and artificial intelligence fields. It combines the completeness of Dijkstra's algorithm with the efficiency of heuristic search, and can find the optimal path in directed or weighted graphs. As shown in FIG. 4(a) and FIG. 4(b) show seam lines generated between the master image and the slave image with two intersection points and multiple intersection points, respectively.

This embodiment uses a pixel-based contour generation method to process the orthoimages, ensuring that the generated seam line is always located within the overlapping area between the adjacent orthoimages. The present disclosure facilitates the execution of the optimization algorithm, accurately preserves the geometric information of the images and their overlapping area, and is suitable for determining remote sensing image seam lines in various complex overlapping cases and for arbitrary concave-convex polygon contours. Compared with the mainstream geometric method, the present disclosure has stronger universality. The present disclosure uses a crawling search method to search for the valid contour, which is more suitable for extracting irregular concave-convex polygon contours, avoiding the problem that some invalid pixels are misclassified into a valid area or valid pixels are misclassified into an invalid area, resulting in a void in the mosaicked result or partial information loss of the image. The present disclosure improves the accuracy of the determination of the seam line and enhances the efficiency of the determination. Considering that the overlapping area may be an arbitrary concave-convex polygon, the present disclosure adopts centroid and local search methods to determine the position of the optimization end, making the generated end of the seam line more accurate. The present disclosure quantitatively represents the differences in the overlapping area between the images as a difference map through a difference function, and transforms the process of determining the optimal seam line into the process of finding the optimal path from the optimization start to the optimization end through the A* algorithm. The present disclosure achieves the division of a complex overlapping area through a seam line, improving the accuracy of seam line determination.

In some embodiments, the orthoimages are preprocessed as follows.

Longitude and latitude coordinates corresponding to index values of each pixel in the orthoimages are acquired to obtain reference longitude and latitude of the orthoimages are acquired.

The orthoimages are sorted based on the reference longitude and latitude.

In a specific implementation, each grid or pixel in the orthoimage is essentially the response characteristic of a certain geographical area in the imaging system, so each grid contains the geographical information of that position. Longitude and latitude correspond to the geographic position represented by the pixel. For a remote sensing image of $N_x \times N_y$, the longitude and latitude corresponding to the index value (x, y) are calculated as follows:

$$\begin{cases} lon_i = lon_0 + \Delta x \cdot i \\ lat_j = lat_0 + \Delta y \cdot j \end{cases};$$

where, ($lon_0$, $lat_0$) are longitude and latitude coordinates corresponding to an index value (0,0), and serve as the reference longitude and latitude; and $\Delta x$ and $\Delta y$ are the longitude and latitude resolutions of the image, respectively. These parameters can be acquired from metadata of an orthoimage file.

Multiple orthoimages are mosaicked using a "pairwise processing" approach, where each mosaicking includes two input images: the master image and the slave image. The master image is the result of previous mosaicking, and the slave image is an unprocessed orthoimage. Specifically, the input images are sorted according to the reference longitude and latitude in the strategy of "longitude priority comparison, ascending longitude, descending latitude", and the sorted image order is the execution order of the "pairwise processing" algorithm.

This embodiment ensures that there is an overlapping area between the master image and the slave image during each mosaicking.

In some embodiments, the orthoimages are preprocessed as follows.

Pixels of different orthoimages are represented in a same index coordinate system through interpolation processing.

Longitude and latitude resolutions of the different orthoimages are set to be the same.

In a specific implementation, interpolation processing is executed on the master image and the slave image to ensure that each orthoimage to be mosaicked has the same reference longitude and latitude as well as the same longitude and latitude resolutions. During the implementation process, the pixel with the minimum longitude and maximum latitude in the input image list is usually selected as the reference longitude and latitude for the final mosaic image. The longitude and latitude resolutions can be customized according to user needs or automatically set to the maximum resolution in the input image list.

In this embodiment, in actual image preprocessing, the reference longitude and latitude of each orthoimage to be mosaicked are different, and it is difficult to ensure the same longitude and latitude resolutions between the input images. Therefore, in order to facilitate subsequent pixel-based contour extraction, it is necessary to unify the grids or pixels of the input image into the same index coordinate system. Through interpolation processing, the pixels of different orthoimages are represented in the same index coordinate system, and then the longitude and latitude resolutions of different orthoimages are set to be the same. This step avoids frequent coordinate transformation and interpolation calculations in subsequent steps, improving the execution efficiency of the method.

In some embodiments, the intersection points of the respective valid area contours of the master image and the slave image are determined as follows.

Contour points with same index coordinates in the respective valid area contours of the master image and the slave image are acquired, and the intersection points are acquired.

This embodiment utilizes the convenience of representing the pixels of different orthoimages in the same index coordinate system. This embodiment acquires the intersection points by acquiring contour points with the same index coordinates in the respective valid area contours of the master image and the slave image, improving the execution efficiency of the method.

In some embodiments, the method further includes the following steps.

A contour point lookup table is built based on a hash table and a list, and the contour points of the valid area contours are stored in the contour point lookup table; and It is determined, through the contour point lookup table during an execution process of the crawling search method, whether a searched contour point is already located on a contour line from which the searched contour point is originated. If yes, the contour line is clipped.

Figure 5:
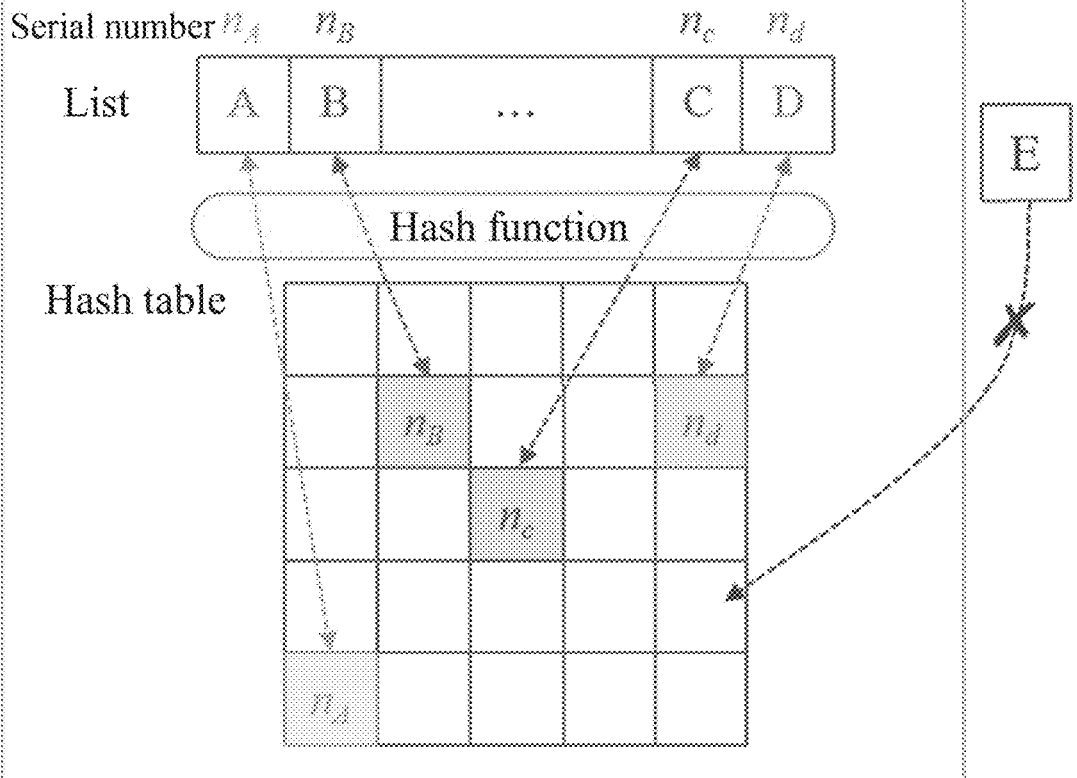
FIG. 5 is a schematic diagram of a contour point lookup table of the method for determining a seam line of orthoimages according to an embodiment of the present disclosure.

In a specific implementation, after the orthoimages are preprocessed, the position of any grid in different images can be represented by index coordinates in the same coordinate system. When there are contour points with the same index coordinates on two contour lines, it indicates that these two contours intersect at this point. Therefore, it is possible to calculate the intersection point of two contours or determine whether a contour point is on the other contour by comparing the index coordinates. In order to improve the efficiency of determination, this embodiment combines the two data structures of hash table and list, abbreviated as a contour point lookup table, to store contour point information. The data structure of list can preserve the relative position relationship of each contour point and quickly acquire the index coordinates of adjacent contour points. The data structure of hash table maps a key to a specific index position through a hash function to achieve fast data retrieval. It can achieve fast data lookup, insertion, and deletion operations, with a typical time complexity of O(1) for each operation. As shown in FIG. 5, the present disclosure takes the index coordinates of the contour points as the keys of the hash table and the serial numbers of the contour points in the list as the corresponding values of the hash table. The contour point lookup table makes it possible to quickly query the position of a contour point at the current contour point and determine the position relationship between the contour point and the current contour point.

Figure 6A:
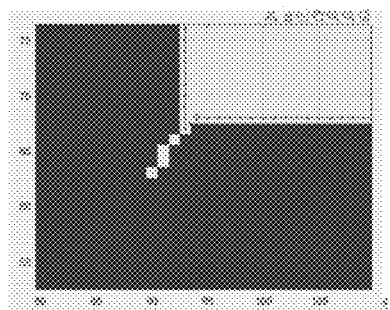
FIG. 6(a) is a schematic diagram of contour line clipping by the method for determining a seam line of orthoimages according to an embodiment of the present disclosure where a burr occurs at the start.
Figure 6B:
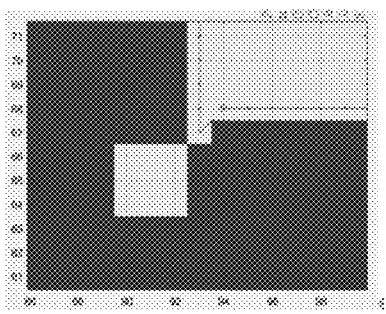
FIG. 6(b) is a schematic diagram of contour line clipping by the method for determining a seam line of orthoimages according to an embodiment of the present disclosure where a small loop occurs during the search process.
Figure 6C:
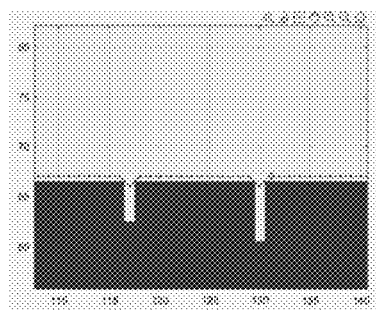
FIG. 6(c) is a schematic diagram of contour line clipping by the method for determining a seam line of orthoimages according to an embodiment of the present disclosure where a burr occurs during the search process.

After the contour point lookup table is acquired, during the execution of the crawling search method, the contour point lookup table is used to determine whether the searched contour point is already located on the contour line from which it is originated. If yes, the contour line is clipped. Specifically, during the crawling search process, when a new contour point B is detected, it is necessary to determine whether the contour point B is already on the contour line through the contour point lookup table. If not, the index coordinates of the contour point B are inserted into the contour point lookup table. If yes, it is necessary to clip the contour line. Assuming the start of the current contour line is O and the end is C, there is a contour point A on the contour line that has the same coordinates as the newly detected contour point B. The number of contour points from the contour point O to the contour point A is denoted as length(OA), and the number of contour points from the contour point A to the contour point C is denoted as length(AC). If the length(OA) is greater than or equal to the length(AC), all the contour points between the contour points A and C are deleted from the contour point lookup table. If the length(OA) is less than the length(AC), all the contour points between the contour point O and the contour point A are deleted. After the clipping is completed, the contour point B is inserted into the contour point lookup table. FIG. 6(*a*), FIG. 6(*b*), and FIG. 6(*c*) show some cases where contour clipping is required, where FIG. 6(*a*) indicates a case where a burr occurs at the start, FIG. 6(*b*) indicates a case where a small loop occurs during the search process, and FIG. 6(*c*) indicates a case where a burr occurs during the search process.

This embodiment improves the efficiency of determining the intersection points of two valid area contours or determining whether the contour point of one valid area is on the other contour. Due to the uniqueness of values in the hash table, the contour point lookup table does not contain contour points with the same position but different list numbers, that is, the contour line has a loop. Therefore, it is necessary to make appropriate improvements to the crawling search method such that the contour points of the valid area contours can be stored in the contour point lookup table.

In some embodiments, the method further includes the following steps.

A valid pixel that is detected through the crawling search method and a search azimuth is not a multiple of 90 degrees (0 degrees, 90 degrees, 180 degrees, 270 degrees), is determined as a diagonal virtual contour point, and the valid pixel is taken as a contour point of the valid area contour.

The contour points of the master image and the slave image in the contour point lookup table are compared to obtain the intersection points.

Figure 7A:
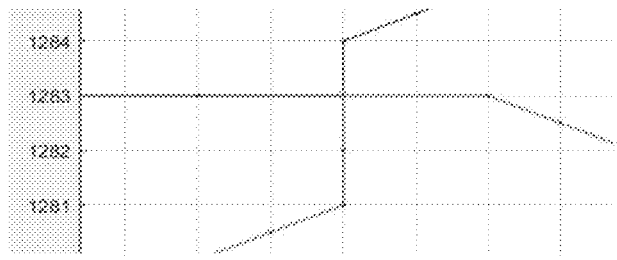
FIG. 7(a) is a schematic diagram of intersection point types of "+"-shaped intersection of the method for determining a seam line of orthoimages according to an embodiment of the present disclosure.
Figure 7B:
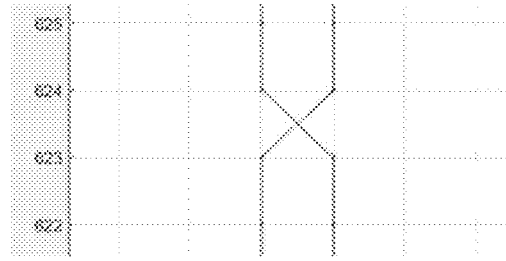
FIG. 7(b) is a schematic diagram of intersection point types of "X"-shaped intersection of the method for determining a seam line of orthoimages according to an embodiment of the present disclosure.

In a specific implementation, as shown in FIG. 7(a) and FIG. 7(b), there are two types of intersection points for the pixel-based contour lines: "+"-shaped intersection and "X"-shaped intersection. FIG. 7(a) and FIG. 7(b) are schematic diagrams of the "+"-shaped intersection and the "X"-shaped intersection, respectively. In the "X"-shaped intersection, there are decimals in the actual intersection coordinates. To avoid missing contour points when calculating intersection points, the intersection points of the "X"-shaped intersection are referred to as the diagonal virtual contour points. These contour points do not correspond to actual grid data, but represent the geometric position relationship between the two contours at the point. When the crawling search method is executed, if the search azimuths for detecting valid pixels are 45°, 135°, 225°, or 315°, a diagonal virtual contour point needs to be inserted first, and then the valid pixels are inserted into the contour point lookup table. Whether it is a general grid (pixel) intersection point or a diagonal virtual contour point, it is necessary to determine whether a contour line clipping operation is required when the valid pixels are inserted into the contour point lookup table.

This embodiment improves the accuracy of intersection point generation, which can enhance the accuracy of seam line determination.

In some embodiments, the intersection contour of the master image and the slave image is acquired as follows.

A position relationship between the contour point of the valid area contour and a grid point is determined.

A start that is located within the overlapping area between the master image and the slave image and is originated from only one contour line is determined.

Based on the position relationship, the contour points of the master image and the slave image are traversed and compared one by one from the start, thereby acquiring the intersection contour.

In a specific implementation, the position relationship between the contour point of the valid area contour and the grid point is as follows.

Figure 8:
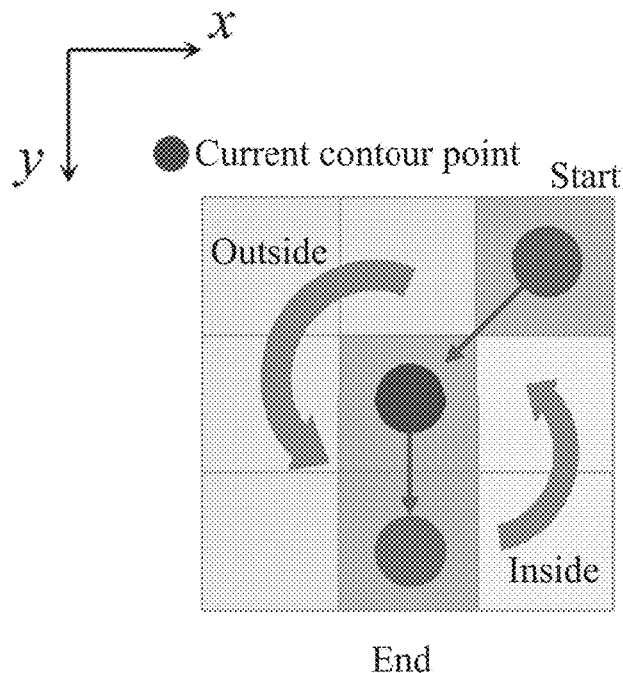
FIG. 8 is a schematic diagram of a position relationship between a contour point and a grid point determined by the method for determining a seam line of orthoimages according to an embodiment of the present disclosure.

As shown in FIG. 8, the purple circle center denotes a contour point. The blue circle center is a previous contour point relative to the current contour point, which is called the start of the current contour point. The red circle center is a next contour point relative to the current contour point, which is called the end of the current contour point. The position relationship between the grid point and contour point in the 3×3 sub-blocks centered on the current contour point are divided into the following five types. (1) Start-to-end: the grids from the start to the end in a clockwise direction, namely the light green grids located outside the image as shown in FIG. 8. (2) End-to-start: the grids from the end to the start in a clockwise direction, namely the light brown grids located inside the image as shown in FIG. 8. (3) On-start: the grid located at the start position. (4) On-end: the grid located at the end position. (5) Origin: the grid located at the position of the current contour point.

After the position relationship is determined, the intersection contour is acquired. Firstly, a start located within the overlapping area and originated from only one contour line is found on the master contour through the contour point lookup table. If the contour line that meets this condition cannot be found, the master contour may not intersect with the slave contour, and the algorithm is terminated. The master contour is the valid contour of the master image. Then, the master contour is set as a reference contour while the slave image is set as a comparison contour, and the start is taken as the current contour point to execute the following steps. If the current contour point is not an intersection point of the two contours, the next contour point of the reference contour is taken as the current contour point. If the current contour is an intersection point of the two contours, the index position and origin of the current intersection point are saved. The origin indicates whether the contour point is originated from the master contour or from the slave contour. Then, the method is executed based on the relationship between the next contour point of the comparison contour and the current contour point. FIG. 9(a), FIG. 9(b), FIG. 9(c), and FIG. 9(d) are schematic diagrams of the relationship between the next contour point of the comparison contour and the current contour point during the process of acquiring the intersection contour, where a reference contour line is marked as a solid line, a comparison contour line is marked as a dashed line, the intersection point of the two contour lines is marked in darker shade, O is the current contour point, A is the start of O, B is the end of O, C is the next contour point of the comparison contour, the "+" area is an area outside the contour, and the "−" area is an area inside the contour. As shown in FIG. 9(a), FIG. 9(b), FIG. 9(c), and FIG. 9(d), if the current contour point is the intersection point of the two contours, there are four cases based on the position relationship, corresponding to four different execution methods. In the "on-end" case shown in FIG. 9(c), the next contour point of the reference contour is taken as the current contour. In the "start-to-end" case shown in FIG. 9(a), the next contour point of the reference contour is taken as the current contour. In the "end-to-start" case shown in FIG. 9(b), the next contour point of the comparison contour is taken as the current contour point, and the reference contour is swapped with the comparison contour. Usually, there is no 'on-start' case. If this case occurs, it means that the start of the algorithm does not meet the condition, and the algorithm is terminated. Additionally, as shown in FIG. 9(d), there is a case where the reference contour turns from a point P to a point C without accessing a point Q. In this case, there are a plurality of overlapping areas between the master image and the slave image.

This embodiment can more accurately determine the intersection contour, thereby more accurately determining the seam line.

In some embodiments, the method further includes the following steps.

If there are a plurality of overlapping areas between the master image and the slave image, the start of each overlapping area is determined through a contour start determination algorithm.

In a specific implementation, as shown in FIG. 10(a) shows a case when there is only one overlapping area between the master image and the slave image, and FIG. 10(b) shows a case when there are a plurality of overlapping areas between the master image and the slave image. If there are a plurality of overlapping areas between the master image and the slave image, the start of each overlapping area is determined through a contour start determination algorithm. When there are a plurality of overlapping areas between the master image and the slave image, the start of each overlapping area is determined by the contour start determination algorithm. The execution process of the contour start determination algorithm includes the following steps. Firstly, similar to the intersection contour acquisition algorithm, a start located within the overlapping area and is originated from only one contour line is found on the master contour. Secondly, starting from this start, the master contour line is wrapped around once, and a number of deviations from the overlapping area during the wrapping process is counted as the maximum number of overlapping areas between the two images. Thirdly, for each deviation from the overlapping area, a contour point within the overlapping area is retained as the execution start for the overlapping area. The acquired execution start is traversed. Before the execution start is input into the intersection contour acquisition algorithm, it is determined whether the current execution start is already on an existing intersection contour. If yes, the start is discarded, otherwise the execution of the intersection contour acquisition algorithm is continued. Finally, the algorithm is executed, and the intersection contour of each overlapping area and each corresponding intersection point are output. FIG. 11(a) and FIG. 11(b) shows the relationship between the number of deviations from the overlapping area and the number of the overlapping areas. FIG. 11(a) shows the position relationship between the master image and the slave image with two overlapping areas, where the contour of the master image deviates from the overlapping area twice and the two overlapping areas are not connected. FIG. 11(b) shows the position relationship between the master image and the slave image with only one overlapping area, where the contour of the master image deviates from the overlapping area twice and the number of overlapping areas is less than the number of deviations.

In this embodiment, it can be seen from the fourth case shown in FIG. 9(a), FIG. 9(b), FIG. 9(c), and FIG. 9(d) that there may be multiple overlapping areas between the master image and the slave image, resulting in multiple intersection contours and corresponding intersection points. In this case, it is necessary to find a suitable start for each overlapping area. The determination of the start for each overlapping area through the contour start determination algorithm makes a preparation for subsequent steps, and is helpful for more accurate determination of the seam line.

In some embodiments, before the intersection contour of the master image and the slave image is acquired, the method includes the following steps.

If there are redundant intersection points due to the respective valid area contours of the master image and the slave image that overlap or are similar in some areas, the redundant intersection points are merged through a contour intersection point merging algorithm.

Figure 12A:
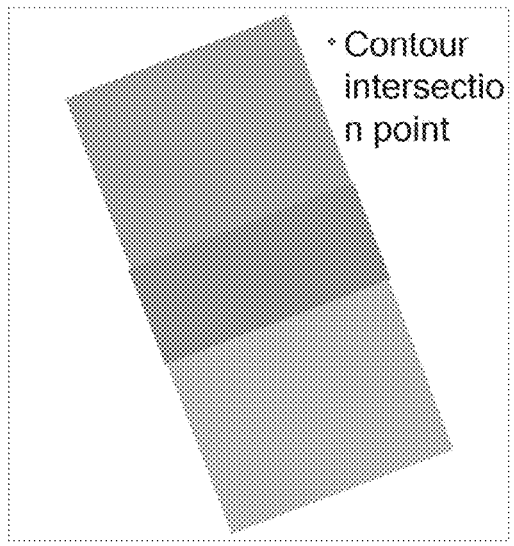
FIG. 12(a) is a schematic diagram of dense contour before intersection point merging of the method for determining a seam line of orthoimages according to an embodiment of the present disclosure.
Figure 12B:
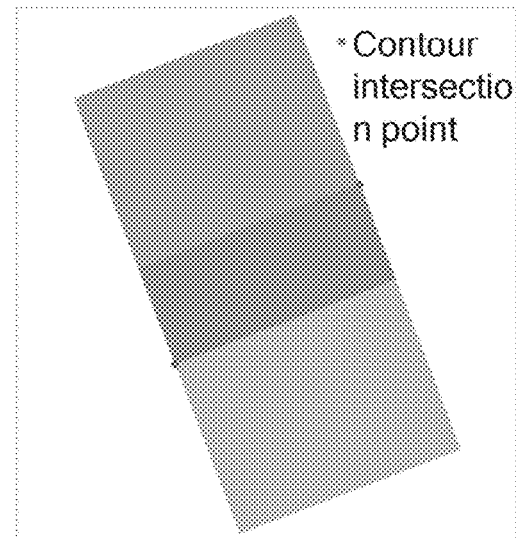
FIG. 12(b) is a schematic diagram of dense contour after intersection point merging of the method for determining a seam line of orthoimages according to an embodiment of the present disclosure.

In a specific implementation, firstly, the origin information in the intersection contour is acquired, which determines whether the intersection point is originated from the master contour or the slave contour. Then, the redundant intersection points are merged through the contour intersection point merging algorithm, which includes the following steps. It is assumed that the list of contour intersection points before merging is sorted clockwise as $[a_1, a_2, \ldots, a_{n-1}, a_n]$. The intersection point list is traversed, and adjacent and identically originated intersection points are divided into a group to acquire $[g_1, g_2, \ldots, g_{k-1}, g_k]$. Each group includes at least one contour intersection point. For each group, only the last contour intersection point within the group is retained as the merged intersection point for the current group, resulting in a list of merged intersection points $[b_1, b_2, \ldots, b_{k-1}, b_k]$. Then, the origins of the first intersection point and the last intersection point in the list of merged intersection points are checked. If the origins of these two intersection points are the same, the last merged intersection point is deleted. Finally, the list of merged intersection points are substituted into the above seam line determination and overlapping area origin determination algorithms. Specifically, before merging, the origins of the list of intersection points are [master, master, . . . , master, slave, slave, . . . , slave], which can be divided into two groups [master, master, . . . , master] and [slave, slave, . . . , slave]. The last intersection point of each group is retained to acquire a list of merged intersection points as [master, slave]. If the origins of the head and tail intersection points are different, the final list of merged intersection points is [master, slave]. FIG. 12(a) and FIG. 12(b) show a case of dense contour intersection points, where FIG. 12(a) is a schematic diagram before intersection point merging, and FIG. 12(b) is a schematic diagram after intersection point merging.

In this embodiment, the master contour and the slave contour may overlap or be similar in some areas, resulting in a large number of redundant intersection points in that area. If all intersection points are used for seam line determination and overlapping area origin determination, it will result in unnecessary increase in algorithm running time. Considering this, this embodiment adopts the contour intersection point merging algorithm, improving the execution efficiency of the method.

The present disclosure further provides a method for generating a mosaic image of orthoimages, including the following steps.

Orthoimages are preprocessed to obtain a master image and a slave image, where there is an overlapping area between the slave image and the master image.

Valid area contours of the master image and the slave image are extracted respectively through a crawling search method.

Intersection points of the respective valid area contours of the master image and the slave image are determined.

An intersection contour of the master image and the slave image is acquired.

Difference values of valid pixels within the overlapping area between the master image and the slave image are calculated through a difference function, to obtain a difference map of the valid area. If there are more than two intersection points, a position of a centroid of the overlapping area is calculated based on coordinates of each contour point of the intersection contour, a rectangular window centered on the centroid in the difference map is determined, the rectangular window is searched, and a position with a smallest difference value is taken as an optimization end and the intersection points as optimization starts. If there are two intersection points, the two intersection points are taken as an optimization start and an optimization end, respectively.

Based on the optimization start and the optimization end, a seam line is determined for the master image and the slave image through an A* algorithm. Pixels close to the seam line are feathered, and weights of the master image and the slave image in the overlapping area are calculated. Where "close to" is defined as a range of 1 to 10 pixels from the seam line.

Based on the weights, weighted fusion is performed on the master image and the slave image to obtain a mosaic image.

Figure 13:
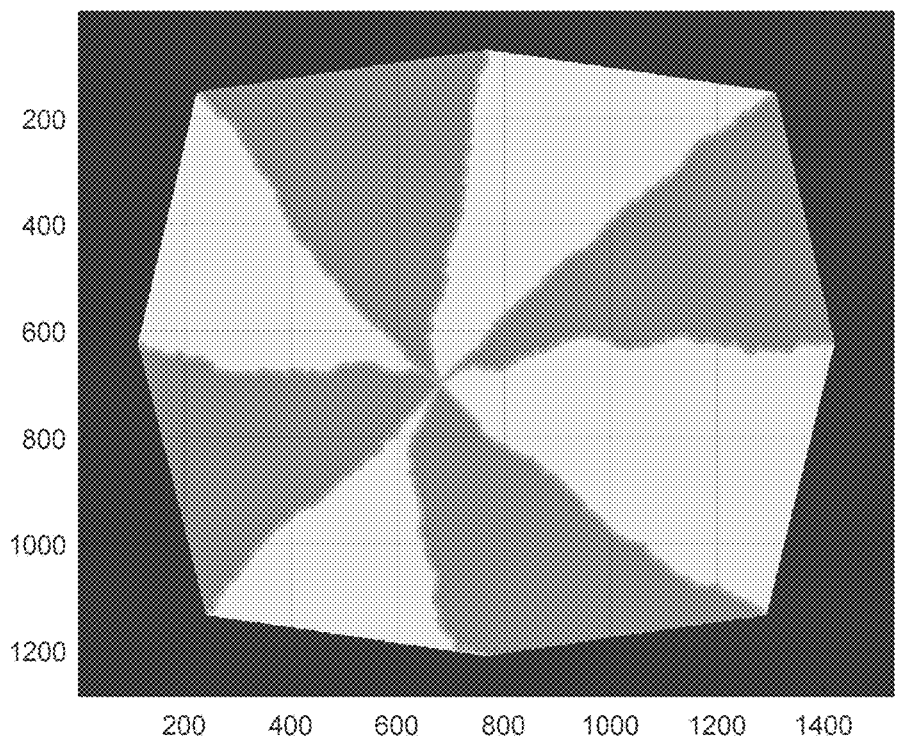
FIG. 13 is a weight diagram of a master image in a method for generating a mosaic image of orthoimages according to an embodiment of the present disclosure.

In a specific implementation, firstly, the seam line of the master image and the slave image is generated by the seam line generation method of the orthoimage. Then, based on the seam line, the origins of the master image and the slave image in the overlapping area are determined. After an origin determination result is acquired, the weights of the master image and the slave image in the overlapping area are calculated. The weight of the master image is shown in FIG. 13. For the master image, the weight of the overlapping area originated from the master contour is 1, and the weight of the overlapping area originated from the slave contour is 0. Pixels close to the seam line are properly feathered to avoid an excessive distance change in the weight on the seam line, thereby achieving better visual effects. If the weight of a pixel (i,j) in the overlapping area between the master contour is W(i,j), then the pixel value corresponding to the mosaic image comes from the weighted fusion of the master image and the slave image, that is:

$$I(i,j)=I_{master}\cdot W(i,j)+I_{slave}(i,j)\cdot(1-W(i,j));$$

Figure 14:
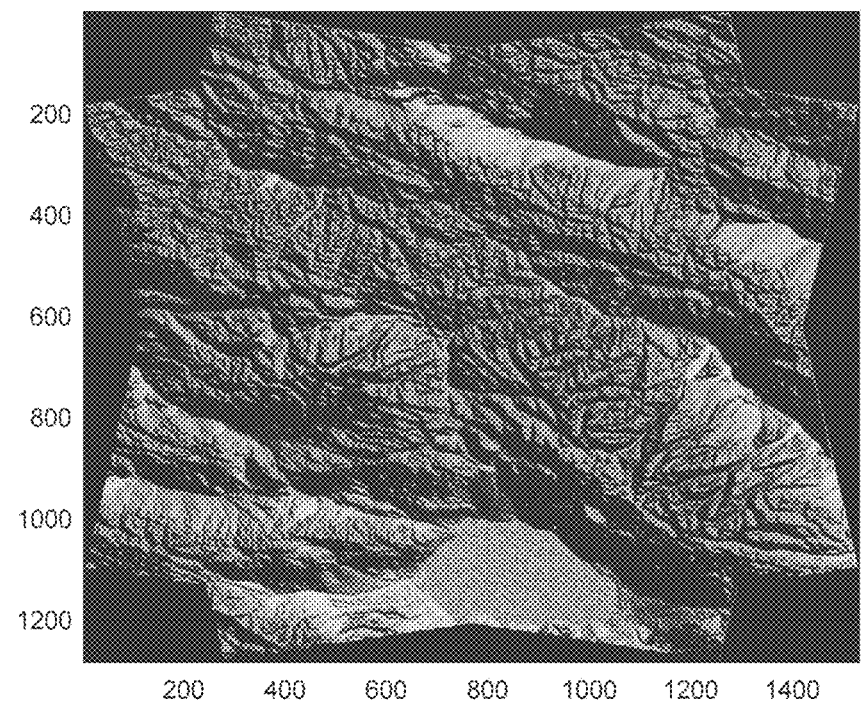
FIG. 14 is a schematic diagram of a mosaic image of the master image and a slave image generated by the method for generating a mosaic image of orthoimages according to an embodiment of the present disclosure.

After the weighted fusion of the master image and the slave image, a mosaic image as shown in FIG. 14 is acquired.

This embodiment achieves the mosaicking of the orthoimages based on the seam line, improving the accuracy of mosaicking the orthoimages based on the seam line.

In some embodiments, before the pixels close to the seam line are feathered, the method includes the following steps.

Origin information of the intersection points in the intersection contour is acquired.

Based on the origin information and after generating the seam line, an origin of an area divided according to the seam line in the overlapping area between the master image and the slave image is determined.

Figure 15:
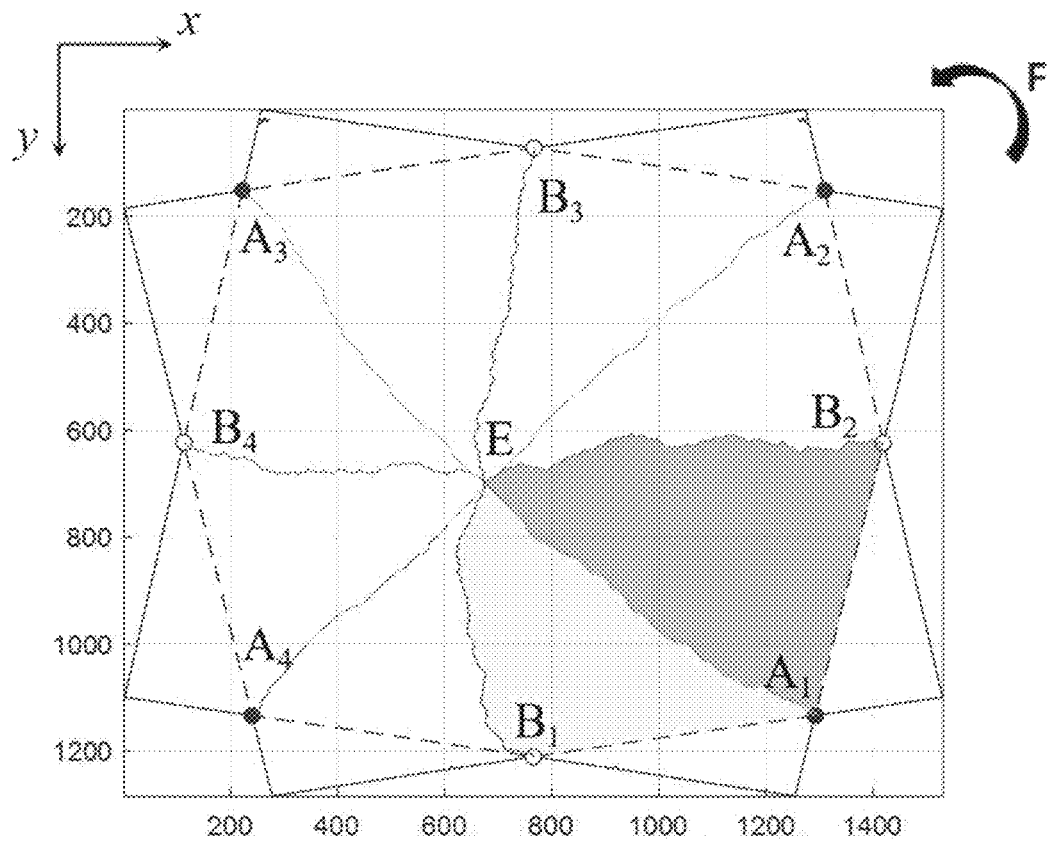
FIG. 15 is a schematic diagram of overlapping area origin determination by the method for generating a mosaic image of orthoimages according to an embodiment of the present disclosure.

In a specific implementation, firstly, the origin information of the intersection points in the intersection contour is acquired. Then, based on the origin information, the origin of the area divided by the seam line is determined according to the following steps. If the intersection point ($A_1$ in FIG. 15) is originated from the master contour, then the area between the intersection point, the previous intersection point ($B_1$ in FIG. 15) in the counterclockwise direction (the direction indicated by the arrow F in the figure is a clockwise direction), and the optimization end (E in FIG. 15) is originated from the slave image (the area filled in blue in FIG. 15). If the intersection point ($B_2$ in FIG. 15) is originated from the slave contour, then the area between the intersection point, the previous intersection point ($A_1$ in FIG. 15) in the counterclockwise direction, and the optimization end (E in FIG. 15) is originated from the master image (filled in red in FIG. 15). Finally, the origin determination result for the overlapping area shown in FIG. 15 is acquired. In the figure, $A_i$ is originated from the contour of the master image, $B_i$ is originated from the contour of the slave image, and E is the optimization end.

This embodiment improves the accuracy of mosaicking the master image and the slave image.

The present disclosure further provides a computer device, including a memory, a processor, and a computer program stored in the memory and executable by the processor, where the processor is configured to execute the computer program so as to implement steps of the method for determining a seam line of orthoimages according to any one of the above embodiments.

The present disclosure further provides a computer device, including a memory, a processor, and a computer program stored in the memory and executable by the processor, where the processor is configured to execute the computer program so as to implement steps of the method for generating a mosaic image of orthoimages according to any one of the above embodiments.

The present disclosure provides a computer-readable storage medium, where the computer-readable storage medium is configured to store a program. The computer-readable storage medium refers to a carrier that stores data, which may include, but is not limited to, a floppy disk, an optical disk, a hard disk, a flash memory, a universal serial bus (USB) flash drive, and/or a memory stick. The computer may be a general-purpose computer, a dedicated computer, a computer network, or another programmable device. The working process, details, and technical effects of the computer-readable storage medium provided by this embodiment can be referred to in the previous embodiment of the method for determining a seam line of orthoimages, which will not be repeated herein.

The present disclosure provides a computer-readable storage medium, where the computer-readable storage medium is configured to store a program. The computer-readable storage medium refers to a carrier that stores data, which may include, but is not limited to, a floppy disk, an optical disk, a hard disk, a flash memory, a universal serial bus (USB) flash drive, and/or a memory stick. The computer may be a general-purpose computer, a dedicated computer, a computer network, or another programmable device. The working process, details, and technical effects of the computer-readable storage medium provided by this embodiment can be referred to in the previous embodiment of the method for generating a mosaic image of orthoimages, which will not be repeated herein.

Those of ordinary skill in the art may understand that all or some of the procedures in the method of the foregoing embodiments may be implemented by a computer program instructing related hardware. The computer program may be stored in a non-transitory computer-readable storage medium. When the computer program is executed, the procedures in the embodiments of the foregoing method may be performed. Any reference to a memory, a storage, a database, or other mediums used in various embodiments provided in the present disclosure may include a non-transitory memory. The non-transitory memory may include a read-only memory (ROM), a programmable ROM (PROM), an electrically programmable ROM (EPROM), an electrically erasable programmable ROM (EEPROM), or a flash memory.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs. The above examples only express several embodiments of the present disclosure, and the description thereof is more specific and detailed, but cannot be construed as a limitation on the scope of the present disclosure. It should be noted that, for a person of ordinary skill in the art, several variations and improvements can be made without departing from the concept of the present disclosure, all of which fall within the protection scope of the present disclosure. Therefore, the protection scope of this application shall be subject to the appended claims.

The invention claimed is:

1. A method for determining a seam line of orthoimages, comprising:
    preprocessing orthoimages to obtain a master image and a slave image, wherein there is an overlapping area between the slave image and the master image;
    extracting valid area contours of the master image and the slave image respectively through a crawling search method;
    building a contour point lookup table based on a hash table and a list, and storing contour points of the valid area contours in the contour point lookup table; and
    determining, through the contour point lookup table during an execution process of the crawling search method, whether a searched contour point is already located on a contour line from which the searched contour point is originated; and if yes, clipping the contour line;

determining intersection points of the respective valid area contours of the master image and the slave image;

acquiring an intersection contour of the master image and the slave image;

calculating difference values of valid pixels within the overlapping area between the master image and the slave image through a difference function, to obtain a difference map of the valid area; if there are more than two intersection points: calculating a position of a centroid of the overlapping area based on coordinates of each contour point of the intersection contour, determining a rectangular window centered on the centroid in the difference map, searching the rectangular window, and taking a position with a smallest difference value as an optimization end and the intersection points as optimization starts; and if there are two intersection points: taking the two intersection points as an optimization start and an optimization end, respectively; and determining, based on the optimization start and the optimization end, a seam line of the master image and the slave image through an A* algorithm.

2. The method for determining a seam line of orthoimages according to claim 1, wherein the preprocessing orthoimages comprises:

acquiring longitude and latitude coordinates corresponding to index values of each pixel in the orthoimages to obtain reference longitude and latitude of the orthoimages; and sorting the orthoimages based on the reference longitude and latitude.

3. The method for determining a seam line of orthoimages according to claim 2, wherein the preprocessing orthoimages comprises:

representing pixels of different orthoimages in a same index coordinate system through interpolation processing; and setting longitude and latitude resolutions of the different orthoimages to be the same.

4. The method for determining a seam line of orthoimages according to claim 3, wherein the determining intersection points of the respective valid area contours of the master image and the slave image comprises:

acquiring contour points with same index coordinates in the respective valid area contours of the master image and the slave image, to obtain the intersection points.

5. The method for determining a seam line of orthoimages according to claim 1, comprising:

In responsive to the valid pixel being detected through the crawling search method and a search azimuth being not a multiple of 90 degrees (0 degrees, 90 degrees, 180 degrees, 270 degrees), determining a valid pixel as a diagonal virtual contour point, and taking the valid pixel as a contour point of the valid area contour; and comparing the contour points of the master image and the slave image in the contour point lookup table to obtain the intersection points.

6. The method for determining a seam line of orthoimages according to claim 5, wherein the acquiring an intersection contour of the master image and the slave image comprises:

determining a position relationship between the contour point of the valid area contour and a grid point;

determining a start that is located within the overlapping area between the master image and the slave image and is originated from only one contour line; and traversing and comparing, based on the position relationship, the contour points of the master image and the slave image one by one from the start, thereby acquiring the intersection contour.

7. The method for determining a seam line of orthoimages according to claim 6, comprising:

determining, if there are a plurality of overlapping areas between the master image and the slave image, the start of each overlapping area through a contour start determination algorithm.

8. The method for determining a seam line of orthoimages according to claim 1, comprising a following step before the acquiring the intersection contour of the master image and the slave image:

merging, if there are redundant intersection points due to the respective valid area contours of the master image and the slave image that overlap or are similar in some areas, the redundant intersection points through a contour intersection point merging algorithm.

9. A method for generating a mosaic image of orthoimages, comprising:

preprocessing orthoimages to obtain a master image and a slave image, wherein there is an overlapping area between the slave image and the master image;

extracting valid area contours of the master image and the slave image respectively through a crawling search method;

building a contour point lookup table based on a hash table and a list, and storing contour points of the valid area contours in the contour point lookup table; and determining, through the contour point lookup table during an execution process of the crawling search method, whether a searched contour point is already located on a contour line from which the searched contour point is originated; and if yes, clipping the contour line;

determining intersection points of the respective valid area contours of the master image and the slave image;

acquiring an intersection contour of the master image and the slave image;

calculating difference values of valid pixels within the overlapping area between the master image and the slave image through a difference function, to obtain a difference map of the valid area; if there are more than two intersection points: calculating a position of a centroid of the overlapping area based on coordinates of each contour point of the intersection contour, determining a rectangular window centered on the centroid in the difference map, searching the rectangular window, and taking a position with a smallest difference value as an optimization end and the intersection points as optimization starts; and if there are two intersection points: taking the two intersection points as an optimization start and an optimization end, respectively;

determining, based on the optimization start and the optimization end, a seam line of the master image and the slave image through an A* algorithm; and feathering pixels close to the seam line, and then calculating weights of the master image and the slave image in the overlapping area; and performing, based on the weights, weighted fusion on the master image and the slave image to obtain a mosaic image.

10. The method for generating a mosaic image of orthoimages according to claim 9, comprising following steps before the feathering the pixels close to the seam line:
acquiring origin information of the intersection points in the intersection contour; and
determining, based on the origin information and after generating the seam line, an origin of an area divided according to the seam line in the overlapping area between the master image and the slave image.

11. A computer device, comprising a memory, a processor, and a computer program stored in the memory and executable by the processor, wherein the processor is configured to execute the computer program so as to implement steps of the method for determining a seam line of orthoimages according to claim 1.

12. A computer device, comprising a memory, a processor, and a computer program stored in the memory and executable by the processor, wherein the processor is configured to execute the computer program so as to implement steps of the method for determining a seam line of orthoimages according to claim 2.

13. A computer device, comprising a memory, a processor, and a computer program stored in the memory and executable by the processor, wherein the processor is configured to execute the computer program so as to implement steps of the method for determining a seam line of orthoimages according to claim 3.

14. A computer device, comprising a memory, a processor, and a computer program stored in the memory and executable by the processor, wherein the processor is configured to execute the computer program so as to implement steps of the method for determining a seam line of orthoimages according to claim 4.

15. A computer device, comprising a memory, a processor, and a computer program stored in the memory and executable by the processor, wherein the processor is configured to execute the computer program so as to implement steps of the method for generating a mosaic image of orthoimages according to claim 9.

16. A non-transitory computer-readable storage medium, wherein the non-transitory computer-readable storage medium is configured to store a program; and the program is executed by a processor to implement the method for determining a seam line of orthoimages according to claim 1.

17. A non-transitory computer-readable storage medium, wherein the non-transitory computer-readable storage medium is configured to store a program; and the program is executed by a processor to implement the method for determining a seam line of orthoimages according to claim 2.

18. A non-transitory computer-readable storage medium, wherein the non-transitory computer-readable storage medium is configured to store a program; and the program is executed by a processor to implement the method for determining a seam line of orthoimages according to claim 3.

19. A non-transitory computer-readable storage medium, wherein the non-transitory computer-readable storage medium is configured to store a program; and the program is executed by a processor to implement the method for generating a mosaic image of orthoimages according to claim 9.

* * * * *